United States Patent
Dixon et al.

(10) Patent No.: US 10,029,246 B1
(45) Date of Patent: Jul. 24, 2018

(54) METHOD OF CLEANING A DIESEL PARTICULATE FILTER

(71) Applicant: Savannah River Nuclear Solutions, LLC, Aiken, SC (US)

(72) Inventors: David R. Dixon, Warrenville, SC (US); Tommy D. Gleaton, Springfield, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 15/414,950

(22) Filed: Jan. 25, 2017

(51) Int. Cl.
*B01J 38/52* (2006.01)
*C11D 7/26* (2006.01)
*C11D 7/44* (2006.01)
*B01J 35/04* (2006.01)

(52) U.S. Cl.
CPC .............. *B01J 38/52* (2013.01); *B01J 35/04* (2013.01); *C11D 7/265* (2013.01); *C11D 7/266* (2013.01); *C11D 7/44* (2013.01)

(58) Field of Classification Search
CPC ............ B01J 38/52; B01J 35/04; C11D 7/265
USPC ......................................................... 502/33
See application file for complete search history.

(56) References Cited

U.S. PATENT DOCUMENTS

| | | |
|---|---|---|
| 7,819,978 B2 | 10/2010 | Thomas et al. |
| 7,837,750 B2 | 11/2010 | Katinas et al. |
| 8,801,818 B2 | 8/2014 | Albrecht et al. |
| 9,371,489 B2 | 6/2016 | Rehage |
| 9,526,692 B2 | 12/2016 | Rehage |
| 2007/0209272 A1* | 9/2007 | Valentine ............... C10L 1/026 44/388 |
| 2011/0010987 A1* | 1/2011 | Knottenbelt ........... C10L 1/026 44/402 |
| 2013/0288935 A1 | 10/2013 | Rehage |
| 2015/0000701 A1 | 1/2015 | Tevely et al. |
| 2015/0108252 A1 | 4/2015 | Ogawa |

FOREIGN PATENT DOCUMENTS

| | | |
|---|---|---|
| EP | 0971012 | 12/2004 |
| WO | WO 2013/056710 | 4/2013 |

* cited by examiner

*Primary Examiner* — Edward Johnson
(74) *Attorney, Agent, or Firm* — Dority & Manning, P.A.

(57) ABSTRACT

The present invention is directed to a method of cleaning a diesel particulate filter. The method requires a step of contacting the diesel particulate filter with a cleaning composition containing one or more fatty acids or a derivative thereof. The one or more fatty acids or a derivative thereof may include a natural oil, such as a plant-based oil.

22 Claims, No Drawings

METHOD OF CLEANING A DIESEL PARTICULATE FILTER

FEDERAL RESEARCH STATEMENT

This invention was made with Government support under Contract No. DE-AC09-085R22470, awarded by the U.S. Department of Energy. The Government has certain rights in the invention.

BACKGROUND OF THE INVENTION

Diesel particulate filters are commonly employed to reduce the particulate matter from the exhaust in many applications that employ diesel engines. These applications can include, but are not limited to, heavy industrial equipment, locomotive equipment, commercial transport vehicles, passenger vehicles, generators, farm equipment, mining equipment, and the like. In general, the purpose of the diesel particulate filters is to collect particles, such as soot and ash, and minimize the amount of such matter that is released into the environment. Commonly, the filters are comprised of a honeycomb-like structure, either made of materials such as stainless steel or ceramics, often with a catalytic coating.

Eventually, the build-up of soot and/or ash on the particulate filters reduces the effectiveness of the filter and the efficiency of the engine eventually preventing the engine from operating. To remedy such issue, a regeneration process is initiated. For instance, when the particulate matter is present in an amount that affects the effectiveness of the engine to a certain degree, the particulate filter is heated in order to try and remove the collected particles. Such particulate matter, such as soot, can be removed via combustion or oxidation.

However, even after initiating such regeneration processes, particulate matter may remain on the diesel particulate filters. In many instances, the particulate filters cannot be cleaned in an effective and efficient manner thereby requiring the diesel particulate filter to be replaced. However, constant replacement of the particulate filter can be quite costly.

As a result, there is a need for an improved method of cleaning a diesel particulate filter.

SUMMARY OF THE INVENTION

Aspects and advantages of the invention will be set forth in part in the following description, or may be apparent from the description, or may be learned through practice of the invention.

In accordance with one embodiment of the present invention, a method of cleaning a diesel particulate filter is disclosed. The method comprises a step of contacting the diesel particulate filter with a cleaning composition containing one or more fatty acids or a derivative thereof.

In accordance with another embodiment of the present invention, a method of improving the efficiency of a diesel engine is disclosed. The method comprises the following: removing a diesel particulate filter from an implement containing a diesel engine and contacting the diesel particulate filter with a cleaning composition containing a fatty acid derivative.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, one embodiment of the present invention is directed to a method of cleaning a diesel particulate filter. The method comprises a step of contacting the diesel particulate filter with a cleaning composition containing one or more fatty acids or a derivative thereof.

Another embodiment of the present invention is directed to a method of improving the efficiency of a diesel engine. The method comprises the following: removing a diesel particulate filter from an implement containing a diesel engine and the diesel particulate filter and contacting the diesel particulate filter with a cleaning composition containing one or more fatty acids or a derivative thereof.

In general, an implement is any machine, vehicle, equipment, etc. that contains a diesel engine and a diesel particulate filter. Implements can include, but are not limited to, heavy industrial equipment, locomotive equipment, commercial transport vehicles, passenger vehicles, generators, farm equipment, mining equipment, and the like. In one embodiment, the implement comprises a motor vehicle. In general, the methods disclosed herein can be employed for cleaning a diesel particulate filter of a motor vehicle.

These diesel particulate filters may be made of materials including, but not limited to, stainless steel or ceramics. Generally, they may have a honey-comb configuration of plugged passages. However, it should be understood that the diesel particulate filters may have a variety of configurations.

Generally, as exhaust gas exits an internal combustion engine, it then enters into a diesel particulate filter. Particulate matter mixed with the exhaust gas is separated by the diesel particulate filter and collected along the inlet of the diesel particulate filter. Thereafter, the exhaust gas then exits the diesel particulate filter. Generally, as such particulate matter is collected on the filter, the effectiveness and efficiency of the diesel engine and the diesel particulate filter is reduced. In typical processes, regeneration processes are initiated to burn off the particulate matter and improve the effectiveness and efficiency of the diesel engine and the diesel particulate filter.

However, using the methods disclosed herein, the present inventors have discovered several advantages. First of all, the methods are effective for removing particulate matter, such as soot and ash, from a diesel particulate filter. The methods and cleaning compositions can efficiently and effectively loosen and remove the accumulated particulate matter from the diesel particulate filter.

Additionally, employing the methods as disclosed herein can be cost effective. For instance, rather than replacing the entire diesel particulate filter, the methods disclosed herein allow for the diesel particulate filter to be reused after cleaning. In the past, when the diesel particulate filters could not be cleaned effectively, such filters had to be replaced. However, the present inventors have discovered a method that allows for the diesel particulate filters to be cleaned and reused.

Additionally, the methods disclosed herein may require a shorter amount of time for cleaning than typically processes. For instance, such cleaning may be conducted within 1 hour, such as within 2 hours, such as within 3 hours, such as within 4 hours, such as within 6 hours. For instance, such time may be based on the time from removal of the diesel particulate filter from the implement thereby allowing for reinstallation of such diesel particulate filter. With the ability to quickly clean the diesel particulate filters, interruption time can be minimized. Meanwhile, regeneration processes may take at least 8 hours and such processes may still not be effective in removing as much particulate matter from the diesel particulate filter as possible.

Moreover, the materials employed in the cleaning composition can be inexpensive. As disclosed herein, in one embodiment, the materials of the cleaning composition may also be biodegradable and environmentally friendly. In this regard, the methods and cleaning composition disclosed herein provide many advantages over current methods of cleaning diesel particulate filters.

In one embodiment, the methods disclosed herein may be employed after a typical regeneration process. For instance, the methods may be employed immediately after a regeneration process. For instance, the methods can be employed within 1 hour, such as within 2 hours, such as within 6 hours, such as within 12 hours, such as within 1 day, such as within 2 days, such as within 3 days, such as within 4 days, such as within 7 days, such as within 10 days of the completion of a regeneration process. However, it should be understood that the methods disclosed herein may not be employed within the aforementioned time durations of having initiated a regeneration process.

Generally, during regeneration, heating is employed so that at least some of the particulate matter is removed via combustion and/or oxidation. Such regeneration processes are performed while the diesel particulate filter is present within the implement. However, some of the particulate matter still remains and requires removal so that the diesel engine and diesel particulate filter can operate efficiently and effectively. Alternatively, the entire diesel particulate filter requires replacement. Such problems can be alleviated using the methods disclosed herein.

Additionally, it should also be understood that the methods disclosed herein may also be employed without having initiated the aforementioned regeneration process. For instance, a regeneration process may not have been employed within the last 1 hour, such as 2 hours, such as 6 hours, such as 12 hours, such as 1 day, such as 2 days, such as 3 days, such as 4 days, such as 7 days, such as 10 days prior to removal of the diesel particulate filter and employing the method disclosed herein. In this regard, the particulate matter can be removed by employing the method and utilizing the cleaning composition disclosed herein.

As indicated above, the methods herein require a step of contacting the diesel particulate filter with a cleaning composition containing one or more fatty acids or a derivative thereof. Such contacting may be conducted using any method generally known in the art.

In one embodiment, the contacting can be performed in such a manner that the cleaning composition flows through the diesel particulate filter. In general, the diesel particulate filters have an inlet side and an outlet side. For instance, the inlet side may be the side that faces the incoming flow of the exhaust gas when installed in an exhaust system. In general, the inlet side may be referred as the side in which the filtered particulate matter is collected. Accordingly, the outlet side is the side that faces away from the incoming flow of exhaust and is the side containing a reduced concentration of the particulate matter and contaminants due to the separation in the diesel particulate filter.

In one embodiment, the contacting step may comprise pouring the cleaning composition such that it flows through the diesel particulate filter. For instance, in one embodiment, the cleaning composition may be poured such that it enters through the outlet side of the diesel particulate filter and exits through the inlet side of the diesel particulate filter. In this regard, the cleaning composition can be employed to remove the particulate matter that collected at the inlet side of the diesel particulate filter.

In another embodiment, the contacting step may comprise submerging at least a portion of diesel particulate filter within a cleaning composition. In one particular embodiment, the entire diesel particulate filter is submerged within a cleaning composition. In one embodiment, the cleaning composition may also be agitated to assist in the separation and removal of the particulate matter from the diesel particulate filter.

In one embodiment, the method may further comprise a step of rinsing the diesel particulate filter after contacting the filter with the cleaning composition. In particular, the rinsing step may be employed using water and may be conducted using any method generally known in the art. The water may assist in removing the particulate matter that may have separated from the diesel particulate filter. Such rinsing step can be employed by pouring water through the diesel particulate filter or submerging the diesel particulate filter in water. Additionally, the water may be employed using a hot pressure wash.

In one embodiment, the method may further comprise a step of exposing the diesel particulate filter to a high pressure stream of air. Such high pressure may also assist in removing the particulate matter that may have separated from the diesel particulate filter. Such exposure can be either before and/or after the step of contacting the diesel particulate filter with the cleaning composition and/or before and/or after the step of rinsing the diesel particulate filter with water.

In one embodiment, the method may further comprise repeating the contacting step, rinsing step, and/or exposing step. In one particular embodiment, the method further comprises a second contacting step of the diesel particulate filter with the cleaning composition. In one particular embodiment, the method further comprises a second rinsing step of the diesel particulate filter.

In one embodiment, the method further comprises a step of removing the diesel particulate filter from an implement containing a diesel engine and a diesel particulate filter. After removal, the diesel particulate filter may be cleaned with the cleaning composition. In one embodiment, the implement may be a motor vehicle.

In another embodiment, the method further comprises a step of installing the diesel particulate filter into an implement. In particular, the diesel particulate filter may be installed after cleaning with the cleaning composition. In one embodiment, the implement may be a motor vehicle.

In one embodiment, prior to or after reinstalling the diesel particulate filter that has already been cleaned with the cleaning composition, the filter may be heated or contacted with a flow of heated air. In one embodiment, the cleaned diesel particulate filter is heated or contacted with a flow of heated air after reinstalling the diesel particulate filter within an implement. Such heating or exposure to heat can be using any manner generally known in the art.

Such heating or exposure to heat may assist in further removal of any particulate matter, such as soot and/or ash. For instance, during this step, any remaining carbon compounds can be burned off the filter. However, it should be understood that the heat should not be to such an extent that the filter becomes damaged. In one embodiment, the diesel particulate filter is heated or contacted with a flow of heated air prior to contacting with the cleaning composition. For instance, such heating may be a regeneration process that is typically initiated. In this regard, the soot and/or ash can be burned and the cleaning composition can be employed for further removing any remaining particulate matter.

During such heating, the temperature may be about 300° C. or more, such as about 400° C. or more, such as about 500° C. or more, such as about 550° C. or more to about 1,000° C. or less, such as about 900° C. or less, such as about 800° C. or less, such as 700° C. or less, such as 650° C. or less.

In one embodiment, the cleaning composition may be recycled. For instance, after contacting a diesel particulate filter with the cleaning composition, it may be collected and recycled for a subsequent contacting step. In particular, it may be employed for a second contacting step of the same diesel particulate filter or a first contacting step of another diesel particulate filter. Prior to reusing the diesel particulate filter for a subsequent contacting step, any solid contaminants in the used cleaning composition may be separated or removed from the cleaning composition to provide a recycled cleaning composition that can be reused. Such separation or removal can be using any method generally known in the art, such as filtration, centrifugation, etc.

As indicated herein, the methods of the present invention require a cleaning composition containing one or more fatty acids or a derivative thereof. In one embodiment, the methods require a cleaning composition comprising one or more fatty acids or a derivative thereof. In another embodiment, the methods require a cleaning composition consisting of one or more fatty acids or a derivative thereof. In this regard, the latter requires 100 wt. % of one or more fatty acids or a derivative thereof.

In one particular embodiment, the methods of the present invention require one or more derivatives of a fatty acid. For instance, in one embodiment, the methods require a cleaning composition comprising one or more derivatives of a fatty acid. In another embodiment, the methods require a cleaning composition consisting of one or more derivatives of a fatty acid. In this regard, the latter requires 100 wt. % of one more derivatives of a fatty acid.

The one or more fatty acids or a derivative thereof may have a carbon chain that may contain 8 carbon atoms or more, such as 10 carbon atoms or more, such as 12 carbon atoms or more, such as 14 carbon atoms or more, such as 16 carbon atoms or more, such as 18 carbon atoms or more to 28 carbons or less, such as 26 carbon atoms or less, such as 24 carbon atoms or less, such as 22 carbon atoms or less, such as 20 carbon atoms or less. In one particular embodiment, the carbon chain length is at least 14 carbon atoms, such as at least 15 carbon atoms. In one particular embodiment, the carbon chain length is less than 20 carbon atoms, such as less than 19 carbon atoms.

In general, the one or more fatty acids or a derivative thereof may be octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, α-linolenic acid, γ-linolenic acid, linoleic acid, stearidonic acid, eicosapentaenoic acid, docosahexaenoic acid, arachidonic acid, docosatetraenoic acid, palmitoleic acid, vaccenic acid, paullinic acid, oleic acid, elaidic acid, gondoic acid, erucic acid, nervonic acid, mead acid, a derivative thereof, or a combination thereof.

In one particular embodiment, the cleaning composition requires a combination of hexadecanoic acid, octadecanoic acid, oleic acid, and linoleic acid or a derivative thereof. In one embodiment, the cleaning composition requires a derivative. In another particular embodiment, the cleaning composition requires a combination of hexadecanoic acid, octadecanoic acid, oleic acid, linoleic acid, linolenic acid or a derivative thereof. In one embodiment, the cleaning composition requires a derivative.

In one embodiment, the one or more fatty acids or a derivative thereof may contain a saturated carbon chain or an unsaturated carbon chain. In one embodiment, the cleaning composition may contain a combination of one or more fatty acids or a derivative thereof wherein at least one saturated carbon chain and at least one unsaturated carbon chain is employed. In one embodiment, the cleaning composition may contain at least two fatty acids or a derivative thereof wherein both have a saturated carbon chain. In one embodiment, the cleaning composition may contain at least two fatty acids or a derivative thereof wherein both have an unsaturated carbon chain. In another particular embodiment, the cleaning composition may contain at least three fatty acids or a derivative thereof wherein all have an unsaturated carbon chain. In one embodiment, the cleaning composition contains at least four fatty acids or a derivative thereof wherein two saturated carbon chains are present and two unsaturated carbon chains are present. In another embodiment, the cleaning composition contains at least five fatty acids or a derivative thereof wherein two saturated carbon chains are present and three unsaturated carbon chains are present.

In one embodiment, the fatty acid or a derivative thereof may comprise a natural oil or a derivative thereof. In general, natural oils are those derived from plants, trees, or animal sources. The term natural oil also includes natural oil derivatives. For instance, in one embodiment, the fatty acid or a derivative thereof may comprise a plant based oil, a tree based oil, a derivative thereof, or a mixture thereof.

In one embodiment, the natural oil may comprise almond oil, avocado oil, canola oil, corn oil, cottonseed oil, flax seed oil, hazelnut oil, hemp seed oil, grapeseed oil, jojoba oil, macadamia nut oil, olive oil, peanut oil, rapeseed oil, rice bran oil, safflower oil, sesame oil, soybean oil, sunflower oil, and walnut oil, a derivative thereof, or a mixture thereof.

In one embodiment, the natural oil may comprise a plant based oil. For instance, the plant based oil may comprise avocado oil, canola oil, corn oil, cottonseed oil, flax seed oil, hazelnut oil, hemp seed oil, grapeseed oil, jojoba oil, macadamia nut oil, olive oil, peanut oil, rapeseed oil, rice bran oil, safflower oil, sesame oil, soybean oil, sunflower oil, and walnut oil. In one particular embodiment, the plant based oil may comprise a soybean oil. In one embodiment, the cleaning composition and/or natural oil may comprise soybean oil or a derivative thereof.

In general, the derivative may be an ester derivative. For instance, the ester derivative may be an alkyl ester derivative. For instance, the ester derivative may be a $C_1$-$C_5$ alkyl derivative, such as a $C_1$-$C_4$ alkyl derivative, such as a $C_1$-$C_3$ alkyl derivative, such as a $C_1$-$C_2$ alkyl derivative, such as a $C_1$ alkyl derivative. In one particular embodiment, the derivative contains a $C_1$ alkyl derivative. In one embodiment, the derivative consists of an alkyl derivative.

In one embodiment, the cleaning composition contains water and the one or more fatty acids or a derivative thereof. For instance, the water may be present in an amount of about 5 wt. % or more, such as about 10 wt. % or more, such as about 25 wt. % or more, such as about 40 wt. % or more, such as about 50 wt. % or more, such as about 60 wt. % or more, such as about 75 wt. % or more. In this regard, the one or more fatty acids or a derivative thereof may be present in the cleaning composition in an amount of about 5 wt. % or more, such as about 10 wt. % or more, such as about 25 wt. % or more, such as about 40 wt. % or more, such as about 50 wt. % or more, such as about 60 wt. % or more, such as about 75 wt. % or more, such as about 90 wt. % or more, such as about 95 wt. % or more, such as about 99 wt. % or more, such as 100 wt. %. However, as indicated herein, the cleaning composition may consist entirely of the one or more fatty acids or a derivative thereof.

Without intending to be limited by theory, it is believed that the fatty acids or a derivative thereof, such as the natural oils, assist in further removal of the particulate matter. For instance, upon cleaning, some of the sheen may remain within the filter. After the filter is reinstalled within an implement and the filter is exposed to heat as indicated above, the sheen may act as an ignition source upon exposure to a high temperature as defined above. The oil can adhere to the particulate matter and assist in burning the remaining particulate matter.

In addition to the methods as disclosed herein, the method may also include additional steps as generally known in the art for cleaning diesel particulate filters. For instance, in one embodiment, at least a portion of the diesel particulate filter, such as the entire diesel particulate filter, is submerged in the cleaning composition containing the fatty acid and an acoustic transducer is operated in a frequency range of from 20 kHz to 100 kHz to induce pressure waves in the cleaning composition containing the fatty acid that separate the contaminants from the filter. Such exposure is described in U.S. Patent Publication No. 2015/0000701 to Tevely et al., which is incorporated herein by reference in its entirety.

In another embodiment, soot and/or ash may be dislodged via acoustic energy. The acoustic energy may be generated using an acoustic generator. Such method is described in U.S. Patent Publication No. 2009/0020136 to Katinas et al.

The methods employed herein can be quite effective in cleaning a diesel a particulate filter. Such effectiveness can be determined simply via a visual assessment of the diesel particulate filter.

In one embodiment, by employing the methods disclosed herein, at least 5 wt. %, such as at least 10 wt. %, such as at least 25 wt. %, such as at least 40 wt. %, such as at least 50 wt. %, such as at least 65 wt. %, such as at least 75 wt. %, such as at least 85 wt. %, such as at least 90 wt. %, such as at least 95 wt. % of the particulate matter is removed from the diesel particulate filter. Such determination can be made by knowing the initial weight of the diesel particulate filter prior to use, the initial weight of the diesel particulate filter containing the accumulated particulate matter prior to cleaning, and the final weight of the diesel particulate filter after cleaning. This can provide the amount of particulate matter accumulated on the diesel particulate filter and the amount of particulate matter removed from the diesel particulate filter upon cleaning.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method of cleaning a diesel particulate filter, the method comprising
    contacting the diesel particulate filter with a cleaning composition containing one or more fatty acids or a derivative thereof wherein the contacting step removes at least some particulate matter from the diesel particulate filter.

2. The method of claim 1, wherein the cleaning composition consists of the one or more fatty acids or a derivative thereof.

3. The method of claim 1, wherein the cleaning composition contains about 50 wt. % or more of the one or more fatty acids or a derivative thereof.

4. The method of claim 1, wherein the cleaning composition contains one or more fatty acid derivatives.

5. The method of claim 4, wherein the one or more fatty acid derivatives comprise an ester derivative.

6. The method of claim 5, wherein the ester derivative is a $C_1$-$C_4$ alkyl ester derivative.

7. The method of claim 5, wherein the ester derivative is a methyl ester derivative.

8. The method of claim 1, wherein the one or more fatty acids or a derivative thereof comprises a natural oil.

9. The method of claim 8, wherein the natural oil comprises a plant-based oil.

10. The method of claim 9, wherein the plant-based oil comprises soybean oil.

11. The method of claim 1, wherein the cleaning composition comprises at least two fatty acids or a derivative thereof wherein one fatty acid or a derivative thereof contains a saturated carbon chain and one fatty acid or a derivative thereof contains an unsaturated carbon chain.

12. The method of claim 1, wherein the cleaning composition comprises at least four fatty acids or a derivative thereof wherein two fatty acids or a derivative thereof contain a saturated carbon chain and two fatty acids or a derivative thereof contain an unsaturated carbon chain.

13. The method of claim 1, wherein the one or more fatty acids or a derivative thereof comprise hexadecanoic acid, octadecanoic acid, oleic acid, linoleic acid, or linolenic acid or a derivative thereof, or a mixture thereof.

14. The method of claim 13, wherein the one or more fatty acids or a derivative thereof comprise at least four of hexadecanoic acid, octadecanoic acid, oleic acid, linoleic acid, or linolenic acid or a derivative thereof.

15. The method of claim 1, wherein the contacting step comprises submerging at least a portion of the diesel particulate filter in the cleaning composition.

16. The method of claim 1, wherein the diesel particulate filter has an inlet side and an outlet side and wherein the contacting step comprises pouring the cleaning composition such that it enters through the outlet side of the diesel particulate filter and exits through the inlet side of the diesel particulate filter.

17. The method of claim 1, further comprising
rinsing the diesel particulate filter with water after the contacting step.

18. The method of claim 17, wherein the rinsing is performed using a hot pressure wash.

19. The method of claim 1, further comprising
exposing the diesel particulate filter to a high pressure stream of air.

20. The method of claim 1, further comprising
removing the diesel particulate engine from an implement containing a diesel engine and the diesel particulate filter, and
installing the diesel particulate engine into the implement after the contacting step.

21. The method of claim 1, further comprising
exposing the diesel particulate filter to a temperature of about 500° C. or more after the contacting step.

22. The method of claim 1, wherein the method can remove at least 75 wt. % of the particulate matter from the diesel particulate filter.

* * * * *